US007780022B2

(12) United States Patent
Vermesi et al.

(10) Patent No.: US 7,780,022 B2
(45) Date of Patent: Aug. 24, 2010

(54) COUPLER MOUNTED BRACKET AND TRAINLINE SUPPORT CASTING

(75) Inventors: George Vermesi, Somerset, NJ (US); Michael Foxx, Hillsborough, NJ (US)

(73) Assignee: Strato, Inc., Piscataway, NJ (US)

( * ) Notice: Subject to any disclaimer, the term of this patent is extended or adjusted under 35 U.S.C. 154(b) by 357 days.

(21) Appl. No.: 11/964,278

(22) Filed: Dec. 26, 2007

(65) Prior Publication Data

US 2009/0166479 A1 Jul. 2, 2009

(51) Int. Cl.
*F16L 3/00* (2006.01)
(52) U.S. Cl. .............................. 213/76; 248/67; 248/53; 248/65
(58) Field of Classification Search ................... 213/76, 213/75 GT; 285/23, 24, 25; 248/70, 65, 248/58, 53, 67
See application file for complete search history.

(56) References Cited

U.S. PATENT DOCUMENTS

| 2,996,315 | A | | 8/1961 | Roth et al. | |
| 3,344,935 | A | | 10/1967 | Stewart et al. | 213/1 |
| 3,567,041 | A | | 3/1971 | Seay | |
| 3,587,868 | A | * | 6/1971 | Yates | 213/1 R |
| 4,069,836 | A | | 1/1978 | Sowinski | |
| 4,099,702 | A | | 7/1978 | Temple | |
| 4,133,561 | A | | 1/1979 | Cannon et al. | |
| 4,215,881 | A | | 8/1980 | Scott et al. | |
| 4,392,575 | A | | 7/1983 | Baker et al. | |
| 4,520,662 | A | | 6/1985 | Schmid | 73/129 |
| 4,592,217 | A | | 6/1986 | Fernandez et al. | 73/129 |
| 4,665,858 | A | | 5/1987 | Harrigal et al. | 116/30 |
| 4,691,563 | A | | 9/1987 | Martin | 73/129 |
| 4,876,885 | A | | 10/1989 | Martin et al. | 73/129 |
| 4,986,500 | A | | 1/1991 | Campbell | |
| 5,131,269 | A | | 7/1992 | Blosnick et al. | 73/129 |
| 5,176,350 | A | | 1/1993 | McQuistian | 248/231.5 |
| 5,287,739 | A | | 2/1994 | Kingsbury | 73/129 |
| 6,135,665 | A | | 10/2000 | Alfieri et al. | 403/61 |
| 6,588,966 | B2 | | 7/2003 | Kane et al. | 403/61 |
| 2004/0155005 | A1 | | 8/2004 | Murphy | |
| 2006/0163442 | A1 | | 7/2006 | Eason | |

OTHER PUBLICATIONS

AAR Manual of Standards and Recommended Practices, Standard S-4021, Apr. 10, 2006.

* cited by examiner

*Primary Examiner*—Mark T Le
(74) *Attorney, Agent, or Firm*—Fitzpatrick, Cella, Harper & Scinto

(57) ABSTRACT

A trainline support casting is provided to support flexible brake hoses between adjacent rail cars. The trainline support casting is capable of partial rotational movement during use and is supported on a mounting bracket adapted to mount directly to a coupler head of a cushioned car coupler, insuring a constant distance from the end of the coupler to the trainline support casting and a constant distance of the brake hoses above the ground according to AAR standards.

11 Claims, 4 Drawing Sheets

COUPLER MOUNTED BRACKET AND TRAINLINE SUPPORT CASTING

BACKGROUND OF THE INVENTION

1. Field of the Invention

The invention is directed to apparatus for mounting a trainline brake system between rail cars. The mounting system and trainline support casting may be used with any type of rail car, but features of the invention are particularly adapted for use with a rail car known as a "cushioned car," characterized by having a shock absorbing cushioning unit.

2. Description of the Related Art

A trainline brake system for a cushioned car generally consists of a rigid pipe fixedly attached to a rail car, terminating in an angle cock valve at the end of the rail car. The angle cock valve is connected to a flexible hose supported on a hanger bracket, which maintains a predetermined distance between the hose and the ground, which distance is specified by standards set by the American Association of Railroads ("AAR"). The flexible hose in turn is connected to a trainline support casting, connected to a further flexible hose terminating in a "glad hand." The glad hand connects to a like series of structures on the next adjacent railcar. This system of flexible hoses between cars permits them to be reliably disconnected from and connected with each other, and supports the trainline through a turn, when the axes of adjacent rail cars and couplers are not in alignment. Failure of these elements may result in brake failure, and there are consequently strict AAR standards, and relatively few acceptable arrangements to meet the above stated objectives.

The distance from the trainline support casting to the end of the coupler is set by AAR standard, currently 21-½ inches to 22-½ inches, but subject to change, so that the precise distance dictated by standards at a particular point in time is not a critical aspect of the present invention. A universal standard permits uniform hoses to be used on freight cars throughout the United States. The hoses achieve a gentle "s" curve in use, which allows some play to connect and disconnect hoses. However, there remains a danger of hose kinking, if the span distance is too short, or uncoupling, if the distance is too great.

Rail cars do not have identical geometry, so it is difficult to have a universal hanger design that will maintain the required distance between the trainline support casting and the end of the coupler in all cases. Conventionally, a bracket form supporting the trainline support casting is mounted to the yoke of a cushioned unit, or to the underbody of a rail car, but these mountings result in more variation in the position of the trainline support casting, due to slack in various components of the system.

A co-pending application by the assignee herein, Ser. No. 11/733,458, filed Apr. 10, 2007, now U.S. Pat. No. 7,637,381, describes and claims a swivel fitting that permits the angle of the trainline support casting to be changed when the end hoses are installed. However, the angle is fixed in use.

Not long after cushioned cars were first introduced, U.S. Pat. No. 3,587,868 to Yates, assigned to Pullman Incorporated, described and claimed a support bracket mounted directly on a coupler head. However the design had significant drawbacks and did not meet with general acceptance. One drawback of the Pullman design is that the mounting of the bracket on the coupler requires all four of the conventionally provided openings on the coupler head, which is not adaptable to variations in coupler head designs. Use of all four apertures also prohibits the mounting of an end-of-train device, which is conventionally mounted on the coupler head using two of the apertures. Further, the Pullman design does not allow the trainline support casting to adjust its angle, and the bracket is positioned so far to the right of the coupler, that it would likely interfere with the angle cock valve on most current cushioned car designs.

The present invention provides for economically positioning the trainline support casting with respect to the coupler head to permit efficient and reliable support, and coupling and uncoupling of brake hoses, while avoiding many of the problems identified in the prior art.

SUMMARY OF THE INVENTION

The invention herein comprises: (i) a trainline support casting capable of partial rotational movement in a horizontal plane while supporting brake hoses between railway cars; (ii) a bracket mounted directly on a coupler of a freight car, for supporting either a trainline support casting according to the invention or other trainline support casting; and (iii) the combination of the trainline support casting and the mounting bracket.

In one aspect, the invention is directed to the trainline support casting itself, which is capable of partial rotational motion in a horizontal plane during use. The casting has a threaded aperture on one side end and a flanged aperture (which is usually also threaded) opposite the threaded aperture. A lip at the top of the casting is capable of being slidingly received in a bracket mounted on a railcar coupler. The trainline support casting is provided with a key pocket on the top thereof, and a key substantially matingly received in the key pocket, and capable of being biased toward the key pocket by a resilient member positioned between the bracket and the key. The trainline support casting is supported in the bracket, and interference between the key and the sides of the respective key pockets in the trainline support casting and in the bracket defines the extent of the partial rotational movement of the support casting.

In another aspect, the invention is directed to a bracket adapted to be directly mounted on a coupler head to support the trainline support casting. The bracket is in the general shape of an "L," having a first arm extending in a substantially vertical direction downward away from the coupler and a second arm extending in a horizontal direction substantially parallel to the axis of the coupler away from the railcar body. An end portion of the bracket away from the coupler receives a trainline support casting (which may be a movable casting, according to the invention, or a fixed casting). Top and bottom mounting holes at a top portion of the bracket are oriented in a single plane and permit insertion of respective top and bottom clamps into openings in the coupler head, which openings in the coupler head are defined by a top rib, a bottom rib and a central rib. A positional mounting hole below the top and bottom mounting holes and oriented at an angle with respect to the plane of the top and bottom mounting holes, receives a fastening member engaging a standard feature of the coupler.

In still another aspect, the invention is directed to the combination of the bracket and the trainline support casting, characterized as a "trainline support system." The system includes the bracket, mounted on a coupler of the rail car and adapted to receive a trainline support casting, and the trainline support casting, adapted to be received in the bracket and supporting a brake hose for the railcar. The bracket is generally "L" shaped, having a first arm extending substantially vertically downward away from the coupler and a second arm, integral with the first arm, extending in a horizontal direction away from the body of the railcar and parallel to the axis of the coupler. The first arm is provided with mounting holes at a top portion thereof permitting mounting to respective openings on the coupler. A key engages a first key pocket in the bracket and a second key pocket in the trainline support casting. A slot at an end portion of the bracket away from the coupler receives the trainline support casting and permits rotation of the trainline support casting from an installation position, in which the key pocket of the bracket is not aligned with the key pocket of the casting, and an installed position, in which the key pockets are aligned and the key is received in the second key pocket. A spring, positioned between the bracket and the trainline support casting, biases the key into the second key pocket. In the installed position, and while the rail car is in use, interference of the key with the key pocket on the trainline support casting and the key pocket on the bracket limits the rotation of the trainline support casting in a horizontal plane with respect to the bracket.

DETAILED DESCRIPTION OF THE PREFERRED EMBODIMENTS

Figure 1:
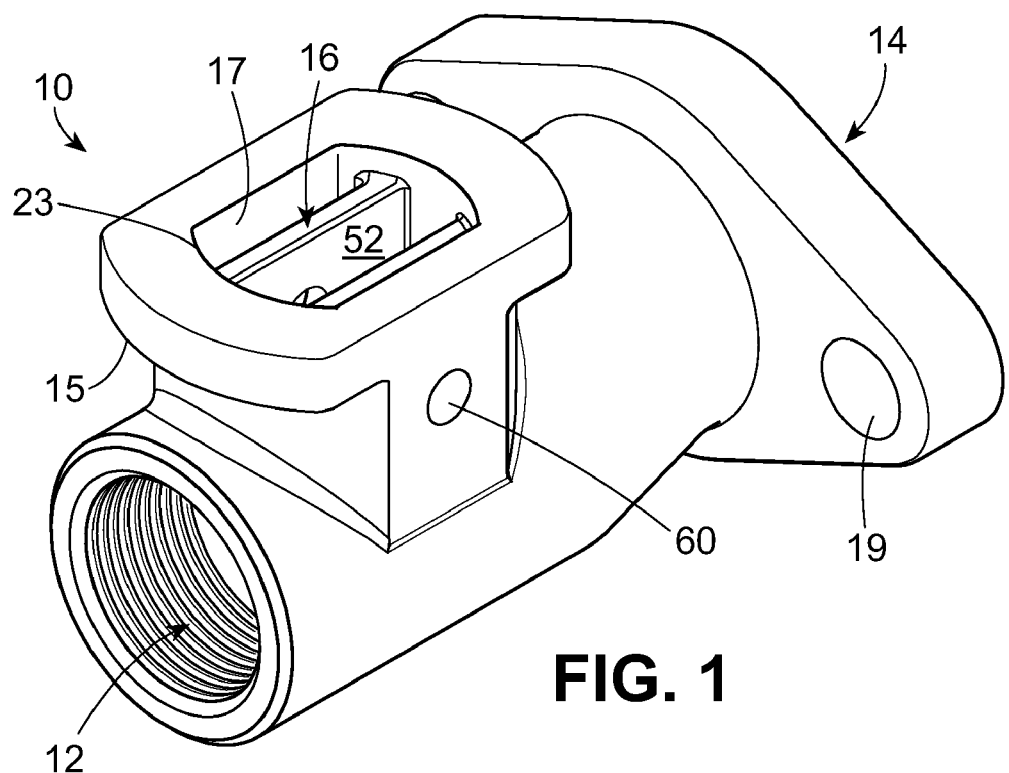
FIG. 1 is a perspective view of a trainline support casting according to the invention.

The preferred embodiments of the invention will be described in connection with the Figures, in which like elements in the different views are identified by the same reference numerals.

A trainline support casting 10 according to the invention is shown in FIG. 1, having a threaded aperture 12 receiving a brake hose (sometimes referred to as the "end hose") and facing generally away from the rail car body when in use. Opposite the threaded aperture, a flanged aperture 14, which is also typically threaded, connects a flexible hose between the support casting and the angle cock valve (not shown). A lip 15 at the top of the casting, is adapted to be slidingly received in a bracket mounted on a railcar coupler, as described in greater detail below. Additional fastening means, such as apertures 19, and cooperating bolts (not shown), may be used to attach the flange to the intermediate hose.

Figure 2:
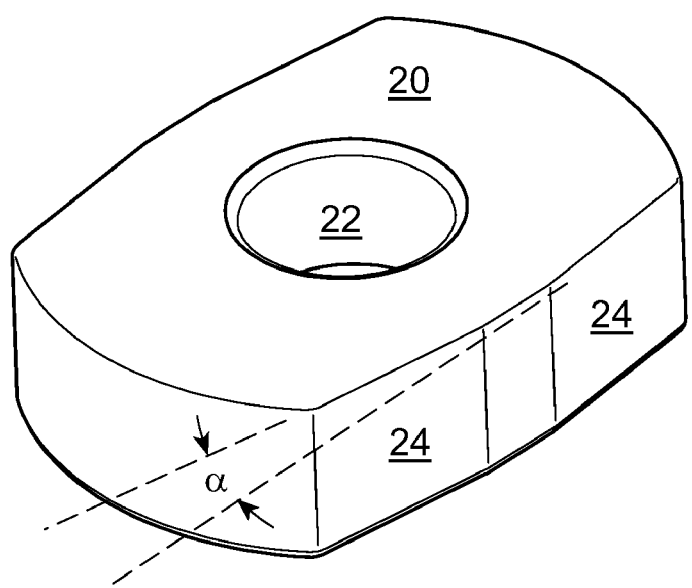
FIG. 2 is a perspective view of a key adapted to be received in a key pocket of the trainline support casting.

A key pocket 16, on the top of the trainline support casting, receives a key 20 shown in FIG. 2 in a substantially mating arrangement. The key 20 is advantageously provided with a recess 22 which receives a resilient member, such as a spring, between the bracket and the trainline support casting which biases the key toward the key pocket 16. The key is preferably provided with angled sides 24, and the interference of angled sides 24 with a corresponding wall 17 of the trainline support casting key pocket 16, and with a wall 45 of the bracket key pocket 44 (shown in FIGS. 4 and 5), defines the extent of rotational movement of the casting, as described in greater detail below.

Figure 3:
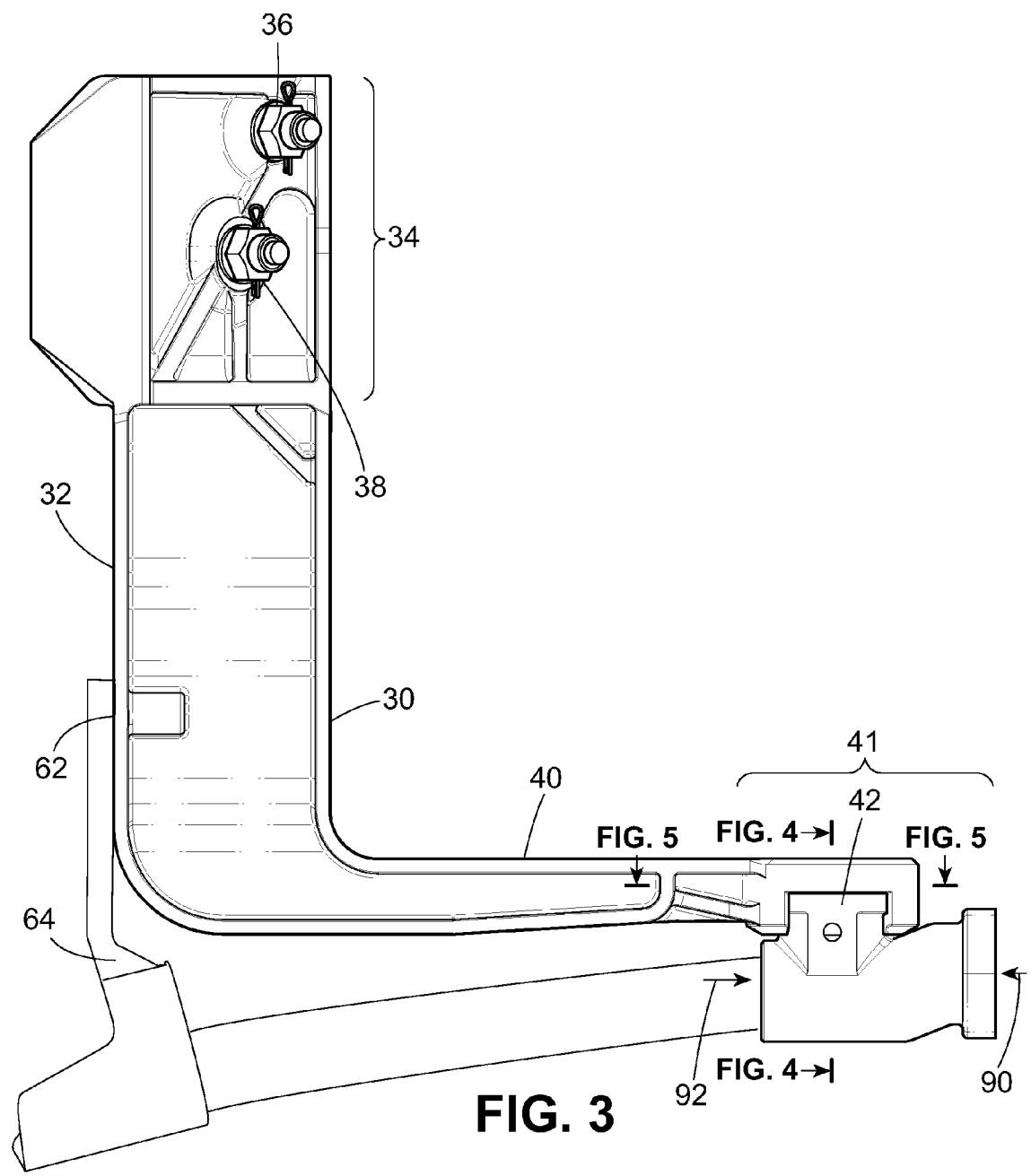
FIG. 3 is a side elevation of a mounting bracket according to the invention, having the trainline support casting and hoses installed thereon.

A bracket 30 is shown in a side elevation view in FIG. 3. A first arm 32 extends vertically downward from the mounting portion 34, which includes a top mounting hole 36, a bottom mounting hole 38, and a positional mounting hole 43 (shown in FIG. 6) for mounting the bracket to the coupler head of the rail car coupler with bolt-clamps or other fastening means. A second arm 40 extends horizontally away from the first arm and, in preferred embodiments, includes a slot 42 for receiving a trainline support casting according to the invention. In other embodiments, a trainline support casting of any type may be attached to an end portion of the bracket. For example, the end portion of the bracket, away from the rail car body, may be bolted to a trainline support casting that does not rotate in a horizontal plane during use.

Although described as a first arm and a second arm in a general "L" shape, the preferred embodiment of the bracket is a unitary cast piece. The bracket may be cast, forged, or made by weldment, stamping, fabrication or other means. The inventive features of the bracket reside primarily in the mounting portion 34, including the top, bottom and positional mounting holes, and in the end portion 41, including slot 42 (where applicable). The shape of the bracket between the mounting portion and the end portion away from the car body is not critical, provided of course that a fixed distance is provided between the end of the coupler and the threaded aperture of the trainline support casting facing away from the rail car body, according to the AAR standard.

To mount the trainline support casting to the bracket, the user biases the key 20 into a second key pocket 44 on the bracket and holds the key in place against the normal bias of the spring. The user turns the trainline support casting so that the threaded aperture makes an angle with respect to the axis of the coupler, and so that the key pocket 16 on the casting is not aligned with the key pocket 44 on the bracket. In the most preferred current embodiment, this angle (sometimes referred to herein as "the installation position") is 90° with respect to the axis of the coupler. Importantly, the key 20 is not able to slide into the key pocket 16 on the trainline support casting until the threaded aperture of the trainline support casting is rotated to an installed position. In the most preferred embodiments, the threaded aperture 12 is capable of rotating 30° with respect to the axis of the coupler in the installed position: 20° in a direction to the right of the coupler and −10° to the left of the coupler axis. However, these angles are not critical and may be somewhat more or less on one side or the other, or on both sides, of the coupler axis.

The angle through which the threaded aperture is capable of rotating in a horizontal plane in the installed position is a predetermined angle defined by the interference of the key 20 with the key pocket 16 in the trainline support casting, and with the key pocket 44 in the bracket. Thus, rotation of the trainline support casting is defined by the interference of the angled wall 24 of the key with the wall 17 of the trainline support casting key pocket, and also by interference of the angled wall 24 with the wall 45 of the bracket key pocket, because the two key pockets are offset with respect to each other. It is understood that this interference between the key and the respective key pockets may occur on one or both the left and right sides of the key pocket.

In the preferred embodiment depicted in the Figures, the key pockets have generally straight side walls (17, 45) and curved opposite ends (21, 23), which permit rotational movement of the key 20 in the key pocket. The key 20 has at least one angled side 24, and interference between the angled side 24 of the key and the straight sides of the respective key pockets define the extent of rotation of the trainline support casting. The degree of freedom of rotation for the casting in the installed position is best illustrated in FIG. 2, in the sectional view of FIG. 4, and in the top sectional view of FIG. 5.

Figure 5:
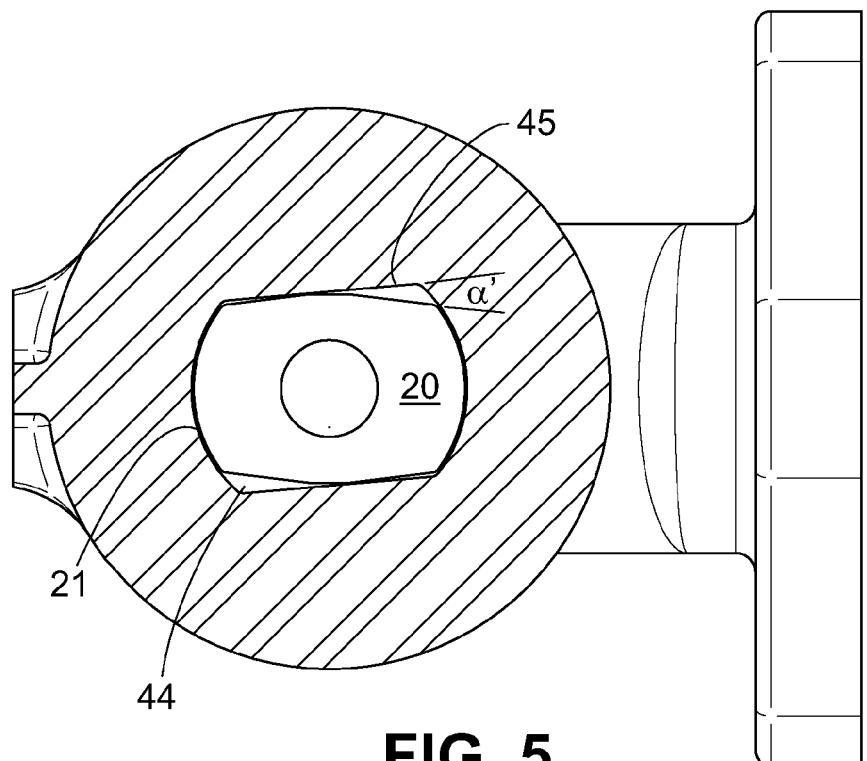
FIG. 5 is a top sectional view of the end portion of the bracket together with the mounted trainline support casting.

For example, an angle α formed by a chamfered side 24 of the key 20 and the corresponding side wall of the key pocket determines how much the support casting 10 can move in the key pocket 16. As seen in the sectional top view of FIG. 5, an angle α' defines the extent of rotation allowed by the interference of the wall 45 of the bracket key pocket with the key 20. Once the bracket key pocket 44 and the casting key pocket 16 (which are sometimes referred to herein as the first pocket and the second pocket, respectively), are aligned sufficiently that the key 20 drops into place, the casting can rotate only so far as there is room between the key pocket wall 17 and the key 20, and between the key 20 and the wall 45 of the bracket key pocket. This can be varied by providing the key with one or more angles, as shown in FIG. 5, or potentially, by changing the dimensions of the key pocket.

As noted above, the axis of the bracket key pocket is not aligned with the axis of the trainline support casting key pocket. The orientation of the bracket key pocket typically defines a larger angle made between trainline support casting and the coupler axis on one side. In preferred embodiments, the key pocket 44 is oriented so that the trainline support casting 10 is capable of rotating from 20° with respect to the coupler axis in one direction and −10° in the other, with a complete span of rotation of 30 degrees. In all of this, it is understood that the position of the angle cock to which connection must be made is on one side of the coupler, and that the trainline support casting is permitted to move so that a fixed distance can be maintained between the end of the coupler and the hose attachment to the trainline support casting. This allows brake lines on adjacent rail cars to be connected with hoses of uniform length, while at the same time allowing them to be attached and detached without kinking or unintentionally uncoupling.

Once the trainline support casting 10 is completely inserted into slot 42, and the casting is rotated to an installed position, the key 20, biased toward the key pocket by spring 18, drops into the key pocket 16. The key is substantially matingly received in the key pocket and is capable of partial rotation in a horizontal plane with respect to the bracket, but may not thereafter freely rotate to the installation position, except when disassembled, as described below.

The trainline support system depicted is capable of withstanding a force of at least 3000 lbs applied to the trainline support casting at a point where the casting supports the brake hose, in the directions shown by arrows 90 or 92.

Figure 6:
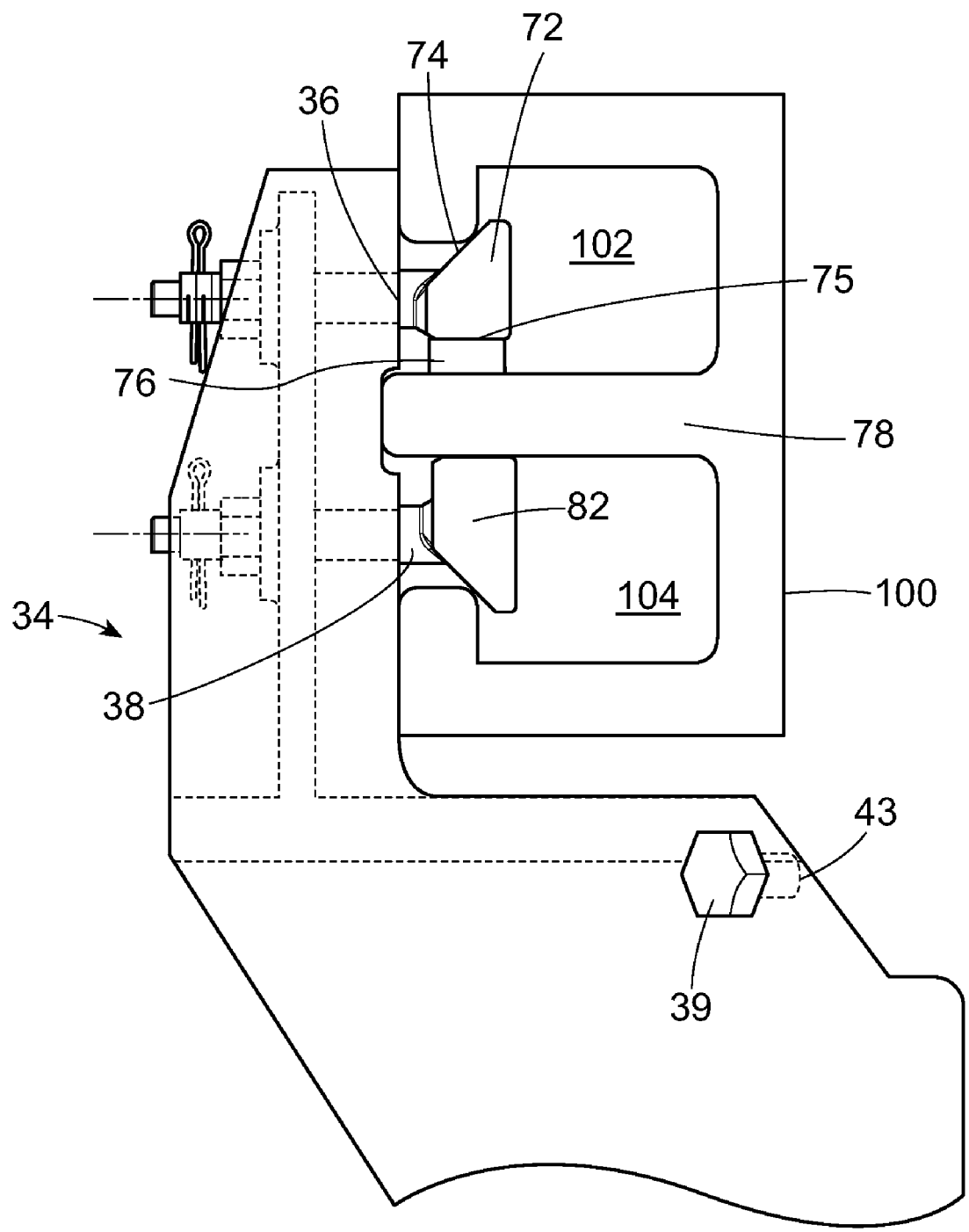
FIG. 6 is a sectional detail view of the mounting portion of the bracket showing the mounting to a coupler head.

The mounting of bracket 30 on a coupler head 100 is shown in FIG. 6, which depicts the mounting portion 34 of the bracket, including the mounting holes 36, 38 and 43, with the clamping bolts 72, 82 and 39 inserted therein. The top and bottom mounting holes at the mounting portion of the bracket are oriented in a single plane and permit insertion of respective top and bottom clamps into openings in the coupler head. Although generally governed by AAR standards, the size and position of the apertures in the coupler head are not strictly controlled, and there is considerable variation in practice. A significant improvement of the present coupler mounted bracket compared to the prior art is that the bracket can be securely and reliably mounted to a variety of coupler head designs while ensuring proper positioning of the trainline support casting without using all of the apertures on the coupler head. Because the bracket mounting utilizes only two of the coupler head apertures, the remaining two apertures can be used to mount end-of-train sensing equipment which is conventionally mounted to these apertures on the last car of a freight train.

Positional mounting hole 43 below the top and bottom mounting holes is oriented at an angle with respect to the plane of the top and bottom mounting holes, for receiving a fastening member engaging a cast feature of the coupler. The arrangement of mounting holes in two planes, each engaging cast features of the standard coupler head, together with ledge 76, which sits on rib 78 of the coupler head, ensures precise positioning of the bracket with respect to three orthogonal axes, so that the trainline support casting is located in position with respect to the coupler head according to the specifications of the AAR standard. The bracket is mounted on a coupler head having a top rib and a center rib defining a top aperture, and a bottom rib and the center rib defining a bottom aperture, which is a standard arrangement of a coupler head. As would be understood by those of ordinary skill in the art, on a typical cushioned car, there are four such openings on the coupler head.

A top clamp 72 is inserted through a first mounting hole 36 on the bracket into the top aperture 102 of the coupler head 100 such that an angled surface 74 of the top clamp tightens against the top rib when the top clamp is tightened. A bottom surface 75 of the top clamp is tightened against a ledge 76 contacting the top surface of the center rib 78 when the top clamp is tightened. A bottom clamp 82 is inserted through the second mounting hole 38 on the bracket into the bottom aperture 104 of the coupling head, such that an angled surface of the bottom clamp tightens against the bottom rib when the bottom clamp is tightened.

Figure 4:
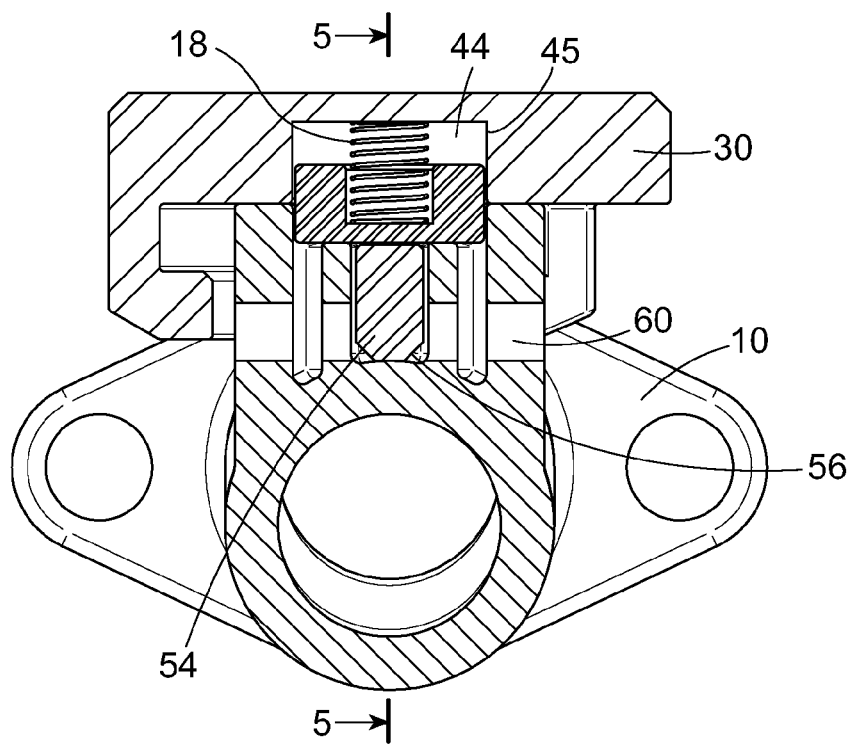
FIG. 4 is a sectional view of the end portion of the bracket together with the mounted trainline support casting.

The mechanism for disassembly is shown most clearly in the sectional view of FIG. 4. To permit disassembly of the trainline support casting from the bracket, a key lifter cavity 52 is positioned below the key pocket 16, and a key lifter 54 is substantially matingly received in the key lifter cavity. The key lifter 54 has a top surface in contact with the key and is configured so that it can be pushed upward to force the key into the bracket key pocket 44. In the preferred embodiment depicted in FIG. 4, the key lifter has a flat surface supporting and in contact with the key. Access to the key lifter is provided by an aperture in the support casting. For example, a key lifter access hole 60 on a side of the support casting may be used, having an opening on the side of the trainline support casting and a second opposed opening in the key lifter cavity. In a preferred embodiment, a bottom surface 56 of the key lifter 54 is angled with respect to the cavity, so that a tool (not shown), inserted in the key lifter access hole 60 permits lifting of the key lifter, and raising of the key against the urging of the resilient member 18 for disassembly of the trainline support casting 10 from the bracket 30.

A hose support connecting feature 62 on the bracket may be provided capable of attaching a hose support 64 to support a hose a given distance above the ground. The hose support 64 attached to the coupler-mounted bracket in this manner is a marked improvement over current hanger systems which have to be manipulated and set to ensure the proper distance of the hose above the ground.

An additional space saving is obtained according to the invention by providing an offset in a vertical direction between the threaded aperture 12 and the flanged, threaded aperture 14. In a most preferred embodiment, the distance between the centers of the apertures 92 and 90 in the vertical direction is ½ inch. This improvement facilitates maintaining the required distance between the brake hoses and the ground, and at the same time provides clearance between the trainline support casting and other components on the railcar and trainline system.

A trainline support casting and bracket according to the invention may be manufactured by any process known in the art, including without limitation, casting (including investment casting), forging, stamping, weldment and fabrication.

In the most preferred embodiments, one or both of the trainline support casting and the bracket are made by casting. One of ordinary skill in the art recognizes that "trainline support casting" is a term of art used to refer to a fitting having the function described herein, and the use of this term does not imply that a trainline support casting is necessarily made by a casting process.

Unless the context requires otherwise, when directions are provided in this application, they are oriented with respect to forward motion of the rail car. Thus "rear" means toward the back of the train, "right," means to the right hand side facing in the direction of forward motion of the train, "up" is in the direction of the sky, etc. Similarly, the "direction" of the trainline support casting, and the "angle" formed by the trainline support casting, refer to the direction of, or the angle formed by, an axis perpendicular to the plane of the threaded aperture of the casting.

The ornamental aspects of the support casting and the combination with the coupler mounted bracket are covered by a design application filed on even date herewith.

The foregoing description of the preferred embodiment is for illustration purposes, and is not to be deemed limiting of the invention, which is defined by the appended claims.

What is claimed is:

1. A coupler mounted bracket for mounting a trainline support casting to a coupler head of a railcar coupler, comprising:
   a first arm extending in a substantially vertical direction downward away from the coupler;
   a second arm, integral with the first arm, extending in a horizontal direction substantially parallel to the axis of the coupler;
   an end portion of the bracket for receiving the trainline support casting and capable of supporting the trainline support casting;
   top and bottom mounting holes at a top portion of the bracket and oriented in a single plane and permitting insertion of respective top and bottom clamps therethrough into openings in the coupler head, said openings in the coupler head defined by a top rib, a bottom rib and a center rib;
   a positional mounting hole below the top and bottom mounting holes and oriented at an angle with respect to the plane of the top and bottom mounting holes, for receiving a fastening member engaging a cast feature of the coupler head; and
   further comprising angled surfaces on the top and bottom clamps respectively contacting the top rib and the bottom rib of the coupler head.

2. The coupler mounted bracket of claim 1, further comprising a ledge on the bracket contacting a top surface of the center rib of the coupler head.

3. The coupler mounted bracket of claim 1, further comprising:
   a bracket key pocket above a slot positioned at the end portion of the bracket for receiving the trainline support casting;
   a key received in the bracket key pocket;
   a resilient member positioned between the bracket and the key,
   wherein the trainline support casting is received in the slot at an installation position, and rotated to an installed position wherein the key is urged into a key pocket on the trainline support casting; and
   wherein interference between the key and a respective one of the key pockets on the trainline support casting and on the bracket defines a rotational movement of the trainline support casting with respect to the bracket.

4. A trainline support system for a rail car, comprising:
   the coupler mounted bracket according to claim 1 mounted on a coupler of the rail car and adapted to receive the trainline support casting;
   the trainline support casting adapted to be received in the bracket and supporting a brake hose for the railcar.

5. The trainline support system of claim 4, wherein the trainline support casting rotates about 90° from an installation position to an installed position.

6. The trainline support system of claim 4, wherein the trainline support casting has a threaded aperture receiving the brake hose and facing generally in a direction away from a rail car body when in use, rotating in a horizontal plane no more than a predetermined distance in each direction measured with respect to the longitudinal axis of the coupler.

7. The trainline support system of claim 4, wherein:
   the bracket is mounted on the coupler head having the top rib and the center rib defining one of the openings, and the bottom rib and the center rib defining another one of the openings;
   wherein the top clamp is inserted through the top mounting hole on the bracket into the one of the openings of the coupler head such that the angled surface of the top clamp tightens against the top rib when the top clamp is tightened;
   wherein a surface of the top clamp is tightened against a ledge contacting a top surface of the center rib when the top clamp is tightened;
   wherein the bottom clamp is inserted through the bottom mounting hole on the bracket into the another one of the openings of the coupler head, such that the angled surface of the bottom clamp tightens against the bottom rib when the bottom clamp is tightened; and
   wherein the positional mounting hole on the bracket is oriented at an angle to the top or bottom mounting hole, to ensure accurate positioning of the trainline support casting with respect to the coupler.

8. The trainline support system of claim 4, capable of withstanding a force of at least 3000 lbs applied to the trainline support casting at a point where the casting supports the brake hose.

9. The trainline support system of claim 4, further comprising:
   a key lifter cavity positioned below a key pocket of the trainline support casting;
   a key lifter substantially matingly received in the key lifter cavity, having a top surface in contact with a key and having a bottom with an angled side;
   a key lifter access hole on the side of the support casting having an opening on a side of the support casting and a second opposed opening in the key lifter cavity; whereby
   a tool inserted in the key lifter access hole permits lifting of the key lifter, and raising of the key against an urging of a resilient member for disassembly of the trainline support casting from the bracket.

10. The trainline support system of claim 4, further comprising a hose support connecting feature on the bracket capable of attaching a hose support for supporting a hose.

11. The coupler mounted bracket of claim 1, made by casting, forging, weldment, stamping or fabrication.

* * * * *